United States Patent
Pfeil

(10) Patent No.: US 8,344,059 B2
(45) Date of Patent: Jan. 1, 2013

(54) TWO-COMPONENT MORTAR COMPOSITION SUITABLE FOR CONSTRUCTION PURPOSES, ITS USE AND THE CURED STRUCTURAL OBJECTS OBTAINED THEREBY

(75) Inventor: Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/955,834

(22) Filed: Nov. 29, 2010

(65) Prior Publication Data

US 2011/0136942 A1  Jun. 9, 2011

(30) Foreign Application Priority Data

Nov. 30, 2009  (EP) .................................... 09177429

(51) Int. Cl.
*C08K 3/34* (2006.01)
*C08K 3/00* (2006.01)
(52) U.S. Cl. ............................................ 524/451; 524/2
(58) Field of Classification Search .................. 526/308, 526/318, 320, 418, 355, 387; 524/609, 451
See application file for complete search history.

(56) References Cited

U.S. PATENT DOCUMENTS

2002/0091214 A1    7/2002  Waanders et al.
2008/0300361 A1 *  12/2008 Jansen et al. .................. 524/609

FOREIGN PATENT DOCUMENTS

| EP | 0 761 792 B1 | 3/2000 |
| EP | 0 713 015 B1 | 8/2001 |
| EP | 0 974 610 B1 | 3/2004 |
| EP | 1 118 628 B1 | 8/2004 |
| WO | WO 2005/100436 A1 | 10/2005 |
| WO | WO 2007/042199 A1 | 4/2007 |

OTHER PUBLICATIONS

U.S. Patent Application, "A Two-Component Adhesive Suitable for Construction Purposes, Its Use and the Cured Structural Bonds Obtained Thereby", Inventors Frank Thiemann, et al., filed Nov. 29, 2010.

* cited by examiner

*Primary Examiner* — Hui Chin
(74) *Attorney, Agent, or Firm* — Crowell & Moring LLP

(57) ABSTRACT

A two-component mortar composition suitable for construction purposes is disclosed. The two-component mortar composition includes a resin component A with a resin curable with a peroxide containing at least one norbornene group and at least one methacrylate containing compound and a hardener component B with a peroxide and at least one thiol. At least one of the resin component A and the hardener component B contains at least one inorganic filler. The resin component A and the hardener component B are spatially separated from one another to inhibit any reaction before mixing of the components.

22 Claims, No Drawings

TWO-COMPONENT MORTAR COMPOSITION SUITABLE FOR CONSTRUCTION PURPOSES, ITS USE AND THE CURED STRUCTURAL OBJECTS OBTAINED THEREBY

The present invention relates to a two-component mortar composition, its use for construction purposes, preferably for fastening of threaded anchor rods, reinforcing irons, threaded sleeves and screws in boreholes of any kind of substrate and cured structural objects obtained by curing said mortar composition.

As used herein, suitable for construction purposes means that the mortar composition upon curing results in structural objects. As meant herein, structural objects are considered to have a thickness of at least 0.5 mm and appropriate mechanical properties.

To define the technical wording used within this document, a mortar composition comprises a curable resin, fillers and further additives to adjust reactivity and rheology of the mortar. Usually, it is applied as a two-component system consisting of the filled resin in a first component, and the hardener in a second component. The use of such a two-component mortar composition requires mixing of the resin component with the hardener component prior to its use.

One of the more demanding structural applications is the chemical anchoring application, as in this application the mechanical strength, the adhesion to concrete and the adhesion to steel must be very good.

Chemical anchoring methods using resin compositions based on epoxides, and which are cured with amines are known. Reference can, for instance, be made to EP 1118628 and EP 0974610. Such state of the art resin compositions exhibit, when cured, many desirable properties like low shrinkage etc., which makes them useful for oversized drill-holes. However, these resins cure only very slowly at room temperature and do not cure at all at lower temperatures. A further disadvantage of these resin compositions is the fact the amines employed are generally considered to be toxic and corrosive.

This problem of insufficiently quick curing at room temperature and at temperatures below room temperature is overcome by using resin compositions in which the resin and reactive diluent are solely based on methacrylates. Reference can, for instance, be made to EP 0713015 and EP 0761792. According to EP 0761792 fast curing gel times in the order of several minutes can be achieved at room temperature. However, these methacrylate based resin compositions for chemical anchoring exhibit, upon curing, substantial shrinkage.

WO2007/042199 describes a method for chemical anchoring using resin compositions comprising a thiol component, a non aromatic carbon double bond containing resin, such as a norbornene functional resin, and optionally a reactive diluent. These resin compositions advantageously result in faster (compared to epoxy-amine resin systems as referred to above) curing in particular at low temperatures and in lower shrinkage (compared to methacrylate resin systems as referred to above), Examples of suitable reactive diluents that may be used according to WO2007/042199 are, for instance, dicyclopentadiene (DCPD), norbornadiene, vinylnorbornene, epoxyethyl norbornene. Considering the examples, an allyl containing reactive diluent especially triallyl isocyanurate (TAIC) was used as reactive diluent.

A disadvantage of the reactive diluents described in this publication is their relatively poor cutting power which means that for reducing the viscosity a relatively large amount of reactive diluent is required, which may result in reduced mechanical properties. However for many construction purposes the resins need to be filled or reinforced. These applications generally require low to very low viscosities of the resin in order to have a workable viscosity of the composite, filled resinous composition.

Another disadvantage is that changing the amount of reactive diluent only to a small extent has a large impact on the amount of thiol needed, making the system less robust, i.e. highly sensitive to variation in reactive diluent content.

WO-A-2005/100436 describes resin compositions that comprises a thiol component (XH component), a non aromatic carbon double bond containing component (RU component) and in which at most 5 mol % of the reactive unsaturations are capable of undergoing homopolymerisation, i.e. at most 5 mol % (meth)acrylates. Thus, this publication teaches away from using (meth)acrylates.

The object of the present invention is to provide a two-component mortar composition suitable for construction purposes, which has similar bonding properties like state-of-the-art epoxy-amine systems but which have a higher reactivity resulting in faster curing speed, higher performance at lower installation temperatures and despite the higher curing velocity provide a long gel-time, i.e. a long working time for the user resulting in higher flexibility in workflow, and which are free of corrosive amines, thus resulting in advantageous properties concerning environmental, health and safety aspects.

This object is provided by the two-component mortar composition according to the claims.

Subject-matter of claim 1 therefore is a two-component mortar composition suitable for construction purposes comprising a resin component A comprising a resin curable with a peroxide containing at least one norbornene group and at least one methacrylate containing compound; and a hardener component B comprising a peroxide and at least one thiol; wherein at least one of the resin component A and the hardener component B contains at least one inorganic filler; and wherein the resin component A and the hardener component B are spatially separated from one another to inhibit any reaction before mixing of said components.

The subclaims relate to further embodiments of this two-component mortar composition, its use for construction purposes, preferably for fastening of threaded anchor rods, reinforcing irons, threaded sleeves and screws in boreholes of any kind of substrate and cured structural objects obtained by curing said two-component mortar composition or obtained by the above use.

As can be taken from the examples and the comparative examples below, the two-component mortar compositions of the present invention provide for a faster curing in comparison to the comparative mortar compositions, provide longer gel-times and have a better performance at lower installation temperatures at −5° C. without a substantial decrease in the bonding performance.

An additional surprising advantage of mortar compositions according to the invention is that the shrinkage upon curing is low. This is very surprising since it is known that methacrylate based resin compositions exhibit, upon curing, substantial shrinkage, generally in the order of 15-20%.

The two-component mortar composition of the present invention preferably is being used for chemical anchoring, but can also be used for the manufacture of for example automotive parts, boats, roofing, construction, containers, relining, pipes, tanks, flooring, windmill blades. As meant herein, chemical anchoring refers to chemical fastening of anchoring elements, such as tie bars, dowels, rock bolts, screws, anchor rods in for example boreholes in concrete, bricks, natural and artificial rocks.

The resin component A of the mortar composition of the present invention comprises as the resin curable by a peroxide a resin which comprises at least one norbornene group, preferably at least two norbornene groups and more preferably at least three norbornene groups per molecule.

The resin containing at least one norbornene group comprises as the norbornene group a group of the following general formula:

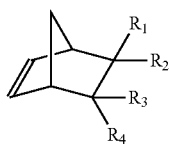

wherein each of the groups $R_1$, $R_2$, $R_3$, and $R_4$, can independently be chosen, for instance, from the group of hydrogen, carboxylates, nitriles, alkyl groups, alkenyl groups, aryl groups, and/or substituted derivatives of such groups, or wherein two or more of such groups may form additional ring structures, or wherein any of such groups is part of a polymeric residue. In a preferred embodiment, at least part of the norbornene groups in the resin is connected to the resin via both $R_1$ or $R_2$ and $R_3$ or $R_4$ as this generally result in improved mechanical properties.

According to another embodiment, besides the norbornene groups, the resin containing at least one norbornene group may contain other reactive carbon-carbon unsaturations as non-aromatic carbon double bond moieties preferably selected from the group of allyl, vinyl, (meth)acrylic, fumaric, maleic, itaconic, crotonic, or cinnamic double bond moieties, or of Diels Alder adducts thereof. When containing other reactive carbon-carbon unsaturations than norbornene, preferred are methacrylic groups.

Preferably, the resin contains at least two reactive carbon-carbon unsaturations, more preferably at least three reactive carbon-carbon unsaturations.

Preferably, the resin containing norbornene groups has a molecular weight of at least 500 Dalton, more preferably at least 750 Dalton and even more preferably at least 1000 Dalton. Preferably, the resin containing norbornene groups has a molecular weight of at most 10.000 Dalton, preferably at most 8000 Dalton, most preferably at most 6000 Dalton.

Many thiol-containing compounds can suitably be employed as thiol in the resin composition according to the invention. These compounds can be aromatic thiophenols, but also aliphatic thiols can be used. Preferably, the resin composition contains an aliphatic thiol.

Especially useful are the esters of α-mercapto acetate or β-mercapto propionate with mono alcohols, diols, triols, tetraols, pentaols and other polyols. The alcohol group, which is functionalized with the α-mercapto acetate or β-mercapto propionate, can be part of a polymer. Also mixtures of alcohols can be used. Most preferably, the aliphatic thiol is an α-mercapto acetate or β-mercapto propionate, or a derivative or mixture thereof.

Preferably, at least part of the thiols present in the resin composition has a thiol functionality of at least 2, more preferably at least 3

In a preferred embodiment, the resin composition comprises a mixture of thiols which mixture has an average thiol functionality of at least 1.5, preferably at least 2, more preferably at least 2.5.

In a preferred embodiment, at least a part of the thiol present in the resin composition is a thiol derived from a mercapto propionate or mercapto acetate.

Especially suitable thiols, with a thiol-functionality equal to or higher than 3 are trimethylolpropane tris-mercapto acetate, trimethylolpropane tris-mercapto propionate, pentaerythritol tetra-mercapto acetate, pentaerythritol tetra-mercapto propionate, dipentaerythritol hexa-(3-mercaptopropionate), glycerol tris-(3-mercaptopropionates), dipentaerythritol hexa-mercapto acetate, trivinylcyclohexyl polymercaptan, trithiocyanuric acid, and their ethoxylated or propoxylated derivatives.

The resin composition according to the invention comprises a methacrylate containing compound as reactive diluent. The diluent, for instance, will be applied for adjustment of the viscosity of the resin composition in order to make handling thereof more easy.

In a preferred embodiment of the invention, at least a part of the methacrylate containing compound is at least difunctional in methacrylate, more preferably difunctional or trifunctional because the use of difunctional or trifunctional methacrylates may result in faster and more efficient curing. Preferably, the methacrylate containing compound or mixtures thereof has an average functionality of at least 1.5, more preferably of at least 2. Examples of preferred methacrylate containing compounds applicable as reactive diluents are ethanediol-1,2-dimethacrylate (EGDMA), butanediol-1,4-dimethacrylate (BDDMA), triethyleneglycoldimethacrylate (TEGDMA), glycerinedimethacrylate (CDMA) and trimethylolpropanetrimethacrylate (TMPTMA).

Preferably, the resin composition A comprises at least 15% by weight, more preferably at least 25% by weight of methacrylate containing compound. Preferably, the resin composition comprises at most 70% by weight, more preferably at most 60% by weight of methacrylate containing compound, in which 100% is the sum of the methacrylate containing compound and the resin containing norbornene groups.

The mortar composition according to the invention preferably comprises the thiol and the resin containing at least one norbornene group in such amounts that the ratio of the norbornene groups in the resin component A and the thiol groups in the hardener component B ranges from 10:1 to 1:10 preferably 5:1 to 1:5 more preferably from 2:1 to 1:2 and most preferably is around 1:1

The resin component A of the two-component mortar composition according to the invention preferably further comprises a transition metal compound as a curing accelerator. The presence of such transition metal compound is beneficial as it accelerates the curing of the resin composition with a peroxide. The transition metal is preferably selected from the transition metals with atomic numbers ranging from atomic number of in the range from 22 to 29 or with an atomic number in the range from 38 to 49 or with an atomic number in the range from 57 to 79. More preferably, the transition metal is selected from V, Mn, Cu, Fe.

Said resin component A can contain co-accelerators like 1,3-dicarbonyl compounds, e.g. 1,3-diketones and aldehydes, in particular acetyl acetone, benzoyl acetone, and dibenzoyl methane; mono- and diesters, more in particular diethyl malonate and succinates, acetoacetates like ethyl acetoacetate, acetoxy acetyl ethylmethacrylate or the like, for further increasing the reactivity especially at low temperatures, if required.

The resin component A of the two-component mortar composition according to the invention is curable with a peroxide. The peroxides used for the initiation of the curing reaction to obtain a structural part can be any peroxide known to the skilled man for being used in curing of unsaturated polyester resins and vinyl ester resins. Such peroxides include organic and inorganic peroxides, whether solid or liquid; also hydrogen peroxide may be applied. Examples of suitable peroxides are, for instance, peroxy carbonates (of the formula —OC(O) OO—), peroxyesters (of the formula —C(O)OO—), diacylperoxides (of the formula —C(O)OOC(O)—), dialkylperoxides (of the formula —OO—), etc. They can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

The peroxide is preferably a hydroperoxide, perether, perester, peranhydride or percarbonate, more preferably the peroxide is selected from the group of percarbonates, peresters and hydroperoxides and most preferably the peroxide is a monopercarbonate such as for instance Trigonox 117 or a perester such as for instance Trigonox C.

The storage stability of the resin compositions according to the invention is improved if, and this is preferred, the resin component A further comprises one or more inhibitors. Preferably at least one of the inhibitors is selected from phenolic compounds, N-oxyl compounds or nitroso compounds.

Suitable examples of inhibitors that can be used in the resin component A are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dim ethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

In accordance with the invention, the resin component A and/or the hardener component B contain at least one inorganic filler, such as, preferably, quartz, glass, corundum, porcelain, stone ware, light spar, heavy spar, gypsum, talcum, chalk or mixtures thereof, these fillers being contained in the form of sands, flours or molded objects, especially in the form of fibers or spheres.

To adjust the viscosity and flow behavior of the mortar components, further additives like fumed silica, polymeric thickening agents, clays and the like can be incorporated in either one or both components.

The two-component mortar composition may, in addition to the curable resin, also contain in the resin component A an inorganic compound, which can set or polycondense hydraulically, and, in addition to the curing agent, also contain water in the hardener component B. Moreover, as inorganic compound, which can set or polycondense hydraulically, the resin component preferably contains cement, for example, Portland cement or aluminate cement, cements which contain little or no iron oxide being particularly preferred. Gypsum, as such or in a mixture with the cement, can also be used as hydraulically setting inorganic compound. As polycondensable, inorganic compound, the resin component also comprises polycondensable silicate compounds, especially materials containing soluble, dissolved and/or amorphous silica.

According to a further preferred embodiment of the invention the mortar composition is contained in a cartridge, a container, a capsule or a film bag, which comprises two or more chambers, which are separated from one another and in which the resin component A and the hardener component B are contained separated from one another to inhibit any reaction. When the inventive two-component mortar composition is used as intended, the resin component A and the hardener component B are dispensed under the action of mechanical forces or by gas pressure from the cartridges, containers or film bags, mixed with one another, preferably with the help of a static mixer, through which the components are passed, and introduced into the borehole, after which the devices to be fastened, such as threaded anchor rods, etc. are inserted into the borehole charged with curing reaction mortar and adjusted appropriately. In the case of two-component capsules, the capsule is inserted into the hole and the fastening element is drilled in by destroying the capsule and mixing resin and hardener component during installation of the fastening element.

A further object of the invention therefore is the use of the two-component mortar composition described above for fastening threaded anchor rods, reinforcing iron, threaded sleeves and screws in boreholes of any substrate, by chemical reaction of the resin component A with the hardener component B.

The present invention also relates to structural objects as are being obtained when curing the two-component mortar compositions according to the invention. These structural objects have excellent mechanical properties.

An additional object of the present invention is the use of the two-component mortar composition as disclosed above for construction purposes, preferably for fastening of threaded anchor rods, reinforcing irons, threaded sleeves and screws in boreholes of any substrate, comprising curing the composition by mixing the resin component A with the hardener component B. The curing is preferably effected at a temperature in the range of from −20 to +200° C., preferably in the range of from −20 to +100° C., and most preferably in the range of from −10 to +60° C. (so-called cold curing).

The invention is now demonstrated by means of a series of examples and comparative examples. All examples are supportive of the scope of claims. The invention, however, is not restricted to the specific embodiments as shown in the examples.

EXAMPLES/COMPARATIVE EXAMPLES

A) Synthesis of the Norbornene Group Containing Resin

A 2 L reactor equipped with a mechanical stirrer and a Dean Stark set-up was charged with 402 g trimethylolpropane, 147 g maleic anhydride and 1.1 g dibutylhydroquinone. After heating this mixture to 100° C. during 2 h, 218 g toluene 10.9 g p-toluenesulphonic acid and 541 g crotonic acid was added. The reaction mixture was heated to reflux and the water was removed azeotropic during 28 hours. Next 7.7 g trimethylolpropane oxetane was added and the mixture was stirred at 100° C. for an additional hour. Then the toluene and the excess crotonic acid were distilled off resulting in a yellowish resin. This resin was heated to 165° C. and 550 g DCPD was added slowly during 8 hours whilst maintaining the reaction temperature between 165 and 180° C. After complete addition the reaction mixture was kept at 170° C. during 2 more hours before vacuum was applied (15 mBar) during 2 hours after which a norbonene functional resin was obtained. Either Ethanediol, 1,2-dimethacrylate (EGDMA) or Butanediol-1,4-dimethacrylate (BDDMA) was added (27% by weight on final resin) to achieve good handling of the material.

B) Preparation and Testing of Mortar Compositions According to the Present Invention and Comparative Mixtures The raw materials used are as follows:

| Raw material | Comment |
| --- | --- |
| Quarz sand | Medium particle size 0.4 mm, max. particle size 0.7 mm |
| Quarz flour | Particle size below 50 μm |
| Acac | Acetyl acetone |
| Aerosil 200 | Fumed silica |
| PET-3MP | tetra-functional Thiol: penta erythritol tetra mercaptopropionate |
| Trigonox C | tert-Butyl perbenzoate |
| Octasoligen Mn-10 | Manganese catalyst (Mn(II)-ethylhexanoate) |
| TMPTMA | Trimethylolpropane trimethacrylate |
| Tempol | 1-oxyl-2,2,6,6-tetramethylpiperidine-4-ol |

B1) Preparation of Resin Component A

To 47 gram of the above resin was added 26 gram TMPTMA and the mixture was stirred until the resin was completely dissolved. (The total methacrylate content is 45% by weight comprising 15% by weight of either EGDMA or BDDMA and 30% by weight of TMPTMA). Next 0.5 gram of a 1% w/w solution of Tempol in BDDMA and 1 gram of Mn-10 was added followed by 0.5 gram Acac. After homogenization, 42 gram of quartz flour, 22 gram of quartz sand and 2.5 gram of Aerosil 200 were incorporated by a high speed mixer, until a pasty homogeneous component is achieved.

The Compositions prepared are shown in Table 1

B2) Preparation of Hardener Component B 28 gram of PET-3MP and 2 gram of Trigonox C were homogeneously mixed, and 16 gram quartz flour and 2 gram Aerosil 200 were incorporated by a high speed mixer, until a pasty homogeneous component is achieved.

B3) Use of the Two-Component Mortar Composition of the Present Invention

The resin component A and the hardener component B as obtained above, were introduced in side-by-side cartridges in a resin component A:hardener component B volume ratio of 3:1.

The resin component A and the hardener component B were extruded from their cartridges and passed through a static mixer. As the result, the resin component A reacts with the hardener component B curing of the mortar composition. The reacting mixture is injected into a test tube (for measuring the gel-time) or into a borehole in concrete, whereupon the part, which is to be fastened, is introduced and adjusted before achieving the gel-time which is the end of the working time. After full hardening the load values are measured.

C) Testing of the Mortar Composition (1) Gel-Time

The gel time of the mixtures, obtained in this way from the resin component A and the hardener component B of the two-component mortar compositions, is determined with a conventional commercial device (gel timer) at a temperature of 25° C. For this purpose, the components A and B are mixed in a 3:1 ratio by volume and brought into a test tube up to about 4 cm below the rim, the tests tube being maintained at a temperature of 25° C. (DIN 16945, DIN EIN ISO 9396). A glass rod or a spindle is moved up and down in the resin with 10 lifts per minute. The gel time is the time at which the test tube is lifted by the oscillating rod. Random tests showed that the degree of curing at the gel point (measured by means of differential scanning calorimetry (DSC)) is constant within the accuracy of the measurement.

The Gel-times as measured are shown in Table 2

(2) Bond-Strength

For determining the load values of the cured composition, a threaded M12 anchor rod is used, which is doweled with the two-component mortar composition according to the invention or with a comparative mortar composition into a concrete borehole with a diameter of 14 mm and a depth of 72 mm. The average failure load is determined by pulling out the threaded anchor rod centrally with a narrow confinement using high-strength threaded anchors. In each case, 3 threaded anchor rods are doweled in and their load values are generally determined after 24 hours of curing. In particular cases, curing times are varied to test for curing speed.

Different bore-hole conditions and/or curing conditions were tested, see below. Bond strengths (N/mm$^2$) are obtained from the load values by dividing the load value by the bonded surface of the threaded anchor rod are shown in Table 3.

| Test condition | Remark |
| --- | --- |
| Reference | Well cleaned, dry hammer-drilled hole, curing at room temperature |
| −5° C. | Reference holes, but installation and curing at base material temperature −5° C. |
| +40° C. | Reference holes, but installation and curing at base material temperature +40° C. |

The curing behavior of the mortar compositions tested is shown in Table 4

Comparative Mortar Compositions:

Two commercially available chemical fastening systems, which represent the latest state of the art, have been used as comparative products:

| Product name | Type of chemistry | Comment |
| --- | --- | --- |
| Hilti HIT MAX | Fast-curing methacrylate system | Shows fast low-temperature curing and considerable bond-strengths |
| Hilti HIT RE500 | Slow-curing epoxy-amine system | Shows long gel-times, but slow curing at low temperatures, premium bond strengths |

Results

TABLE 1

| Compositions | |
|---|---|
| Resin component A | Methacrylate diluent |
| A-1 | BDDMA/TMPTMA (15:30% by weight) |
| A-2 | EGDMA/TMPTMA (15:30% by weight) |

TABLE 2

| Gel-times | |
|---|---|
| Resin component A + Hardener Component | Gel-time at 25° C. |
| A-1 + Hardener Component B | 13:30 min |
| A-2 + Hardener Component B | 14:00 min |
| HIT RE500 (comprises mortar based on epoxy resin and polyamine hardener) | 12:00 min |
| HIT MAX (comprises mortar based on methacrylate resin and peroxide hardener) | 6:00 min |

TABLE 3

| Bond-strengths | | | | | |
|---|---|---|---|---|---|
| Test | Tcure | A-1 | A-2 | RE500 | MAX |
| Ref | 4 h | 28.7 N/mm² | Not tested | Not cured | 21.2 N/mm² |
|  | 24 h | 31.3 N/mm² | 34.0 N/mm² | 32.7 N/mm² | 23.2 N/mm² |
| −5° C. | 24 h | 21.5 N/mm² | Not tested | Not cured | 22.9 N/mm² |
| +40° C. | 24 h | 30.7 N/mm² | 29.0 N/mm² | 30.7 N/mm² | 19.8 N/mm² |

For A-1, pull-out tests at shorter curing times than 24 h were performed to show the significantly faster curing compared to comparative example HIT RE500

A further test was performed at −5° C. with elongated curing times to check, if the curing freezes or progresses beyond 24 h:

TABLE 4

| Curing behavior at −5° C. | | |
|---|---|---|
| Curing time | A-1 | RE500 |
| 1 day | 21.5 N/mm² | Not cured |
| 2 days | 25.2 N/mm² | 16.0 N/mm² |
| 3 days | 26.3 N/mm² | 18.2 N/mm² |
| 7 days | 27.2 N/mm² | 18.5 N/mm² |

CONCLUSIONS

The two-component mortar composition of the present invention is superior in its performance for anchoring anchor rods in comparison to the comparative mortars. While providing similar bonding properties like the state-of-the-art epoxy-amine systems, the reactivity of the mortar composition of the present invention is much higher resulting in a higher curing speed and a higher performance at lower application temperature. Despite the higher curing velocity of the mortar composition of the present invention, they provide a long gel-time, which is reflected in a long working time for the user resulting in a higher flexibility in the work-flow. The two-component mortar composition of the present invention is free of corrosive amines, resulting in superior environmental properties and with respect to health and safety aspects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A two-component mortar composition, comprising:
   a resin component A comprising a resin curable with a peroxide containing at least one norbornene group and a reactive diluent of at least one methacrylate containing compound; and
   a hardener component B comprising a peroxide and at least one thiol;
   wherein at least one of the resin component A and hardener component B contains at least one inorganic filler;
   and wherein the resin component A and the hardener component B are spatially separated from one another to inhibit any reaction before mixing of the components.

2. The mortar composition according to claim 1, wherein the resin containing at least one norbornene group contains at least 2 norbornene groups per molecule.

3. The mortar composition according to claim 1, wherein the resin containing at least one norbornene group has a number average molecular weight of at least 500 Dalton.

4. The mortar composition according to claim 3, wherein the resin containing at least one norbornene group has a number average molecular weight of at most 10,000 Dalton.

5. The mortar composition according to claim 1, wherein the resin containing at least one norbornene group contains as the norbornene group a group of the general formula:

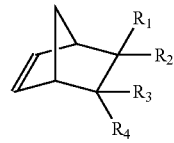

wherein each of the groups $R_1$, $R_2$, $R_3$, and $R_4$, are independently chosen from the group consisting of hydrogen, non-substituted or substituted carboxylate, nitrile, alkyl, alkenyl and/or aryl groups, wherein two or more of such groups may form additional ring structures, or wherein any of such groups is part of a polymeric residue.

6. The mortar composition according to claim 5, wherein at least part of the norbornene groups in the resin is connected to the resin via both groups $R_1$ or $R_2$ and $R_3$ or $R_4$.

7. The mortar composition according to claim 1, wherein the resin containing at least one norbornene group contains besides the at least one norbornene group other reactive carbon-carbon unsaturations as non-aromatic carbon double bond moieties selected from the group consisting of allyl, vinyl, (meth)acrylic, fumaric, maleic, itaconic, crotonic, or cinnamic double bond moieties, or of Diels Alder adducts thereof.

8. The mortar composition according to claim 7, wherein the resin containing at least one norbornene group contains at least two reactive carbon-carbon unsaturations.

9. The mortar composition according to claim 1, wherein the at least one methacrylate containing compound is difunctional or trifunctional in methacrylate.

10. The mortar composition according to claim 9, wherein the at least one methacrylate containing compound is selected from the group consisting of ethanediol-1,2-dimethacrylate (EGDMA), butanediol-1,4-dimethacrylate (BDDMA), triethyleneglycoldimethacrylate (TEGDMA), glycerinedimethacrylate (GDMA) and trimethylolpropane-trimethacrylate (TMPTMA).

11. The mortar composition according to claim 1, wherein the resin component A comprises at least 15% by weight and at most 70% by weight of the at least one methacrylate containing compound in which 100% is the sum of the at least one methacrylate containing compound and the resin containing at least one norbornene group.

12. The mortar composition according to claim 11, wherein the resin component A comprises at least 25% by weight of the at least one methacrylate containing compound.

13. The mortar composition according to claim 1, wherein the resin component A comprises at most 60% by weight of the at least one methacrylate containing compound.

14. The mortar composition according to claim 1, wherein the hardener component B contains a thiol derived from a mercapto propionate or a mercapto acetate.

15. The mortar composition according to claim 14, wherein the thiol is selected from the group consisting of trimethylolpropane tris-mercapto acetate, trimethylolpropane tris-mercapto propionate, pentaerythritol tetra-mercapto acetate, pentaerythritol tetra-mercapto propionate, dipentaerythritol hexa-(3-mercaptopropionate), glycerol tris-(3-mercaptopropionates), dipentaerythritol hexa-mercapto acetate, trivinylcyclohexyl polymercaptan, trithiocyanuric acid, and their ethoxylated or propoxylated derivatives.

16. The mortar composition according to claim 1, wherein the ratio of the norbornene groups in the resin component A and the thiol groups in the hardener component B ranges from 10:1 to 1:10.

17. The mortar composition according to claim 1, wherein the resin component A further comprises a transition metal compound as a curing accelerator.

18. The mortar composition according to claim 1, wherein the resin component A further comprises a 1,3-dicarbonyl compound as a co-accelerator.

19. The mortar composition according to claim 1, wherein any of the components A or B or both further comprises an inhibitor.

20. The mortar composition according to claim 1, wherein the resin component A and/or the hardener component B contain at least one inorganic filler selected from the group consisting of quartz, glass, corundum, porcelain, stone ware, light spar, heavy spar, gypsum, talcum, chalk or mixtures thereof, these fillers being contained in the form of sands, flours or molded objects.

21. The mortar composition according to claim 1, wherein the mortar composition is contained in a cartridge, a container, a capsule or a film bag, which comprises two or more chambers, which are separated from one another and in which the resin component A and the hardener component B are contained separated from one another to inhibit any reaction.

22. A cured structural object obtained by curing the mortar composition according to claim 1.

* * * * *